United States Patent [19]

Kawamura

[11] 4,300,168

[45] Nov. 10, 1981

[54] TELEVISION CAMERA DEVICE

[75] Inventor: Kazuo Kawamura, Yokohama, Japan

[73] Assignee: Tokyo Shibaura Denki Kabushiki Kaisha, Tokyo, Japan

[21] Appl. No.: 128,584

[22] Filed: Mar. 10, 1980

[30] Foreign Application Priority Data

Mar. 9, 1979 [JP] Japan .................. 54-26779

[51] Int. Cl.³ .............................................. H04N 3/18
[52] U.S. Cl. ................................................. 358/210
[58] Field of Search ..................... 358/209, 210, 190;
363/34, 35, 37, 42, 59, 123, 125, 126

[56] References Cited

U.S. PATENT DOCUMENTS

| 3,215,774 | 11/1965 | Ikegami | 358/210 |
| 3,916,436 | 10/1975 | Marey | 358/210 |
| 3,971,976 | 7/1976 | Baker | 363/35 |
| 4,188,568 | 2/1980 | Manners | 358/190 |

OTHER PUBLICATIONS

A Portable Camera Control Unit for the TKP-45 Color Television Camera, Thorpe et al. SMPTE Journal vol. 85 #2 pp. 65-69 Feb. 1976.

*Primary Examiner*—Marc E. Bookbinder
*Assistant Examiner*—Michael A. Masinick
*Attorney, Agent, or Firm*—Finnegan, Henderson, Farabow, Garrett & Dunner

[57] ABSTRACT

In a television camera device, in which a camera head and a camera control unit for processing the video signal output from the camera head and also transmitting camera head control signals to the camera head are connected together by a camera cable, a voltage obtained by full-wave rectifying a single-phase AC is supplied from the camera control unit through the camera cable to the camera head, and in the camera head an AC voltage is produced from the full-wave rectified voltage for using the AC voltage as a drive source for a lens servo-system of the camera head.

4 Claims, 6 Drawing Figures

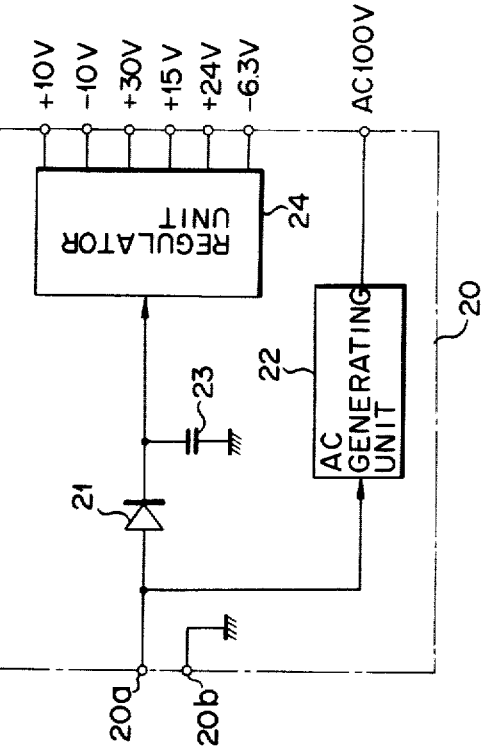
F I G. 4
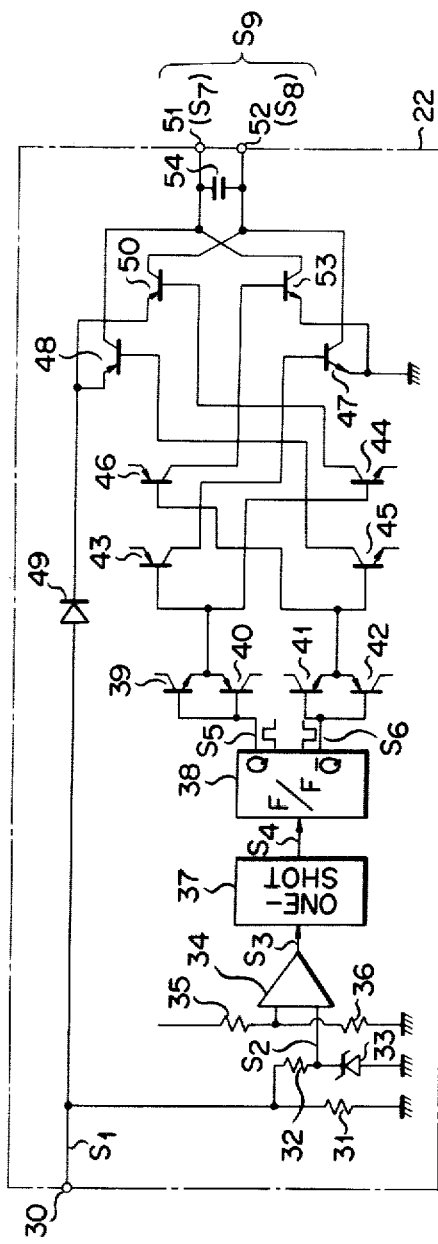
F I G. 5

TELEVISION CAMERA DEVICE

BACKGROUND OF THE INVENTION

This invention relates to a television camera device, which comprises a camera head and a camera control unit for converting video signals obtained from the camera head into corresponding television signals and also for supplying camera head control signals to the camera head.

The television camera device which is used in the studios of television broadcasting stations usually comprises a camera head including an image pick-up tube and a camera control unit for producing a television signal by combining a video signal obtained from the camera head and sync. signals and also for supplying control signals for controlling the optical system, for instance diaphragm and zooming control signals, to the camera head. The camera head is connected to the camera control unit through a camera cable. The camera cable that is used transmits a number of different signals independently of one another, and is usually a multi-core cable, which is heavy and sometimes troublesome when moving the camera head.

In order to eliminate such inconvenience, it has been thought to transmit signals in the form of a multiplexed signal so as to permit use of a thinner and lighter cable. In this case, while the transmission of signals in the multiplexed form between the camera control unit and camera head is possible, there is a problem in the power supply from the former to the latter. Power may be supplied either through an AC or a DC system. In the case of the AC system, it may be thought to supply AC power from the camera control unit to the camera head without using any exclusive transmission line to this end but by making use of, for instance, shield conductors employed in the camera cable. This attempt, however, is prone to electric shock accidents since the shield conductors are usually grounded. To prevent this, it is necessary to provide an insulation transformer or the like within the camera head, and such an insulation transformer increases the bulk and weight of the camera head.

In the case of the DC system, it is necessary to provide a DC-to-AC converter in the camera head since the diaphragm mechanism, zooming mechanism, etc. in the optical system of the camera head require AC power for driving them. The provision of the DC-to-AC converter in the camera head which has a limited space is again undesired from the standpoint of reducing the size and weight of the camera head.

SUMMARY OF THE INVENTION

An object of the invention, accordingly, is to provide a television camera device, which permits the use of a thinner and lighter camera cable without sacrifice in the bulk and weight of the camera head as well as permitting improvement of the operation control property of the camera head.

According to the invention, the above object of the invention is achieved by a television camera device, in which AC current is full-wave rectified before being supplied from the camera control unit through the camera cable to the camera head, and also in which the camera head is adapted to produce AC power, when required, from the full-wave rectification power.

BRIEF DESCRIPTION OF THE DRAWINGS

FIG. 4 is a schematic diagram showing a power source circuit for a camera head used in one embodiment of the invention;

FIG. 5 is a schematic diagram showing a specific circuit construction of an AC generating unit shown in the circuit of FIG. 4.

DETAILED DESCRIPTION OF PREFERRED EMBODIMENTS

Figure 1:
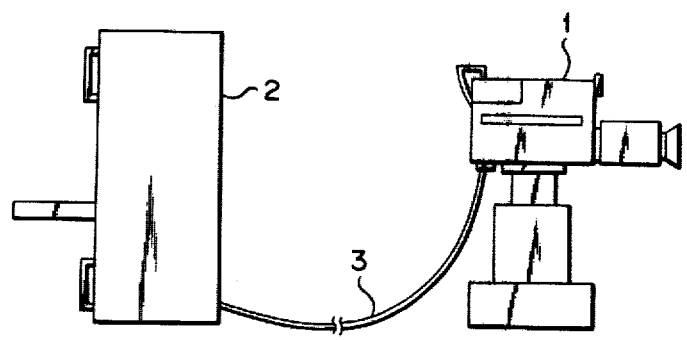
FIG. 1 is a schematic view showing a television camera device according to the invention.
Figure 2:
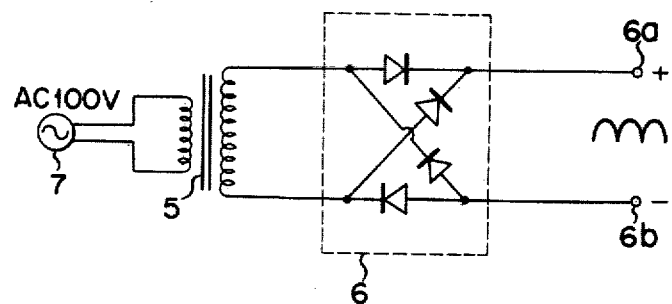
FIG. 2 is a circuit diagram showing a power source circuit for a camera control unit in one embodiment of the invention.

As shown in FIG. 1, the television camera device according to the invention comprises a camera head 1 and a camera control unit 2 connected thereto by a camera cable 3. Through the camera cable 3 various control signals for controlling and adjusting the camera head 1 and a source voltage therefor are supplied from the camera control unit 2 to the camera head 1, while a video output is transmitted from the camera head 1 through the cable 3 to the camera control unit 2. The source voltage supplied from the camera control unit 2 is obtained, for instance, from a circuit as shown in FIG. 2, in which an AC voltage from a 100-volt 50-cycle AC power source 7 is coupled through a transformer 5 to a full-wave rectification circuit 6. The full-wave rectification circuit 6 is a diode bridge circuit consisting of four diodes $d_1$ to $d_4$ connected in the respective illustrated polarities, and a full-wave rectified voltage with a peak value of 140 volts is obtained between its output terminals 6a and 6b.

Figure 3:
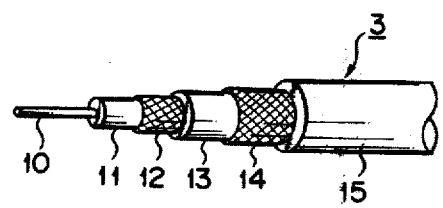
FIG. 3 is a perspective view showing the internal construction of the camera cable shown in FIG. 1.

The full-wave rectified voltage which is obtained in this way is supplied from the camera control unit 2 through the camera cable 3 to the camera head 1. The camera cable 3 is a double-shield single-core cable as shown in FIG. 3, having an insulator 11, a first shield mesh conductor 12, an insulator 13, a second shield mesh conductor 13, an insulator 14 and an outer cover 15 individually formed in the mentioned order on a center conductor 10. The output terminals 6a and 6b of the full-wave rectification circuit 6 are connected to the respective shield mesh conductors 12 and 14, that is, the full-wave rectified voltage is applied between the shield mesh conductors 12 and 14. The outer shield mesh conductor 14 is grounded.

The full-wave rectified voltage supplied from the camera control unit 2 through the camera cable 3 is applied between input terminals 20a and 20b of a power source unit 20 provided within the camera head 1, as shown in FIG. 4. The non-grounded input terminal 20a is connected to the anode side of a diode 21 and also to the input side of an AC 100-volt generating unit 22. The cathode side of the diode 21 is grounded through a capacitor 23, and also it is connected to an input terminal of a regulator unit 24, which is constructed such as to produce DC low voltages of, for instance, +10 volts, +15 volts, +24 volts, +30 volts, −6.3 volts and −10 volts. The regulator unit 24 may use, for instance, an ordinary switching regulator.

The full-wave rectified voltage which is supplied between the input terminals 20a and 20b is smoothed by the circuit consisting of the diode 21 and capacitor 23 before it is coupled to the regulator unit 24.

The AC generating unit 22 is provided for producing a voltage of, for instance, AC 100-volt for energizing a drive motor for a lens servo-system including a diaphragm mechanism and a zooming mechanism in an optical system provided in the camera head 1, and it has a construction, for instance, as shown in FIG. 5.

In FIG. 5, the full-wave rectified voltage is coupled to an input terminal 30 of an AC generating unit 22. The input terminal 30 is grounded through a resistor 31, which is in parallel with a series combination of a resistor 32 and a zener diode 33. The juncture between the resistor 32 and zener diode 33 is connected to one of the input terminals of an operational amplifier 34, which has its other input terminal connected to an output terminal of a voltage setter circuit consisting of resistors 35 and 36. The output terminal of the operational amplifier 34 is connected to an input terminal of one-shot circuit 37, which has its output terminal connected to an input terminal of a flip-flop circuit 38. The flip-flop circuit 38 has its Q output terminal commonly connected to the bases of transistors 39 and 40 and its $\overline{Q}$ output terminal commonly connected to the bases of transistors 41 and 42. The transistors 39 and 40 have their emitters commonly connected, and the common juncture is commonly connected to the bases of transistors 43 and 44. The transistors 41 and 42 have their emitters commonly connected, and the common juncture is commonly connected to the bases of transistors 45 and 46. The transistor 43 has its collector connected to the base of the transistor 47, and the transistor 45 has its collector connected to the base of the transistor 48. The emitter of the transistor 48 is connected through a diode 49 of the illustrated polarity to the input terminal 30 and is also connected to the emitter of a transistor 50. The transistor 48 has its collector connected to one output terminal 51, and the transistor 50 has its collector connected to the other output terminal 52. The transistors 47 and 53 have their emitters both grounded and their collectors connected to the respective output terminals 52 and 51. A capacitor 54 is connected between the output terminals 51 and 52.

The operation of the AC generating unit 22 having the construction shown in FIG. 5 will now be described with reference to FIG. 6. The full-wave rectified voltage coupled to the input terminal 30 is as shown at S1 in (A) in FIG. 6, having valleys V. The zener diode 33 cuts hill portions M of this full-wave rectified voltage S1 to produce a valley signal S2 as shown in (B) in FIG. 6, having valley portions V' corresponding to the valleys V. The valley signal S2 is coupled to the operational amplifier 34, which serves as a waveform shaper circuit to produce a pulse signal S3 as shown in (C) in FIG. 6, having pulses corresponding to the valley portions V'. Each pulse in this pulse signal S3 has a center in the direction of its width coinciding with the center of each valley V of the full-wave rectified voltage S1.

Figure 6:
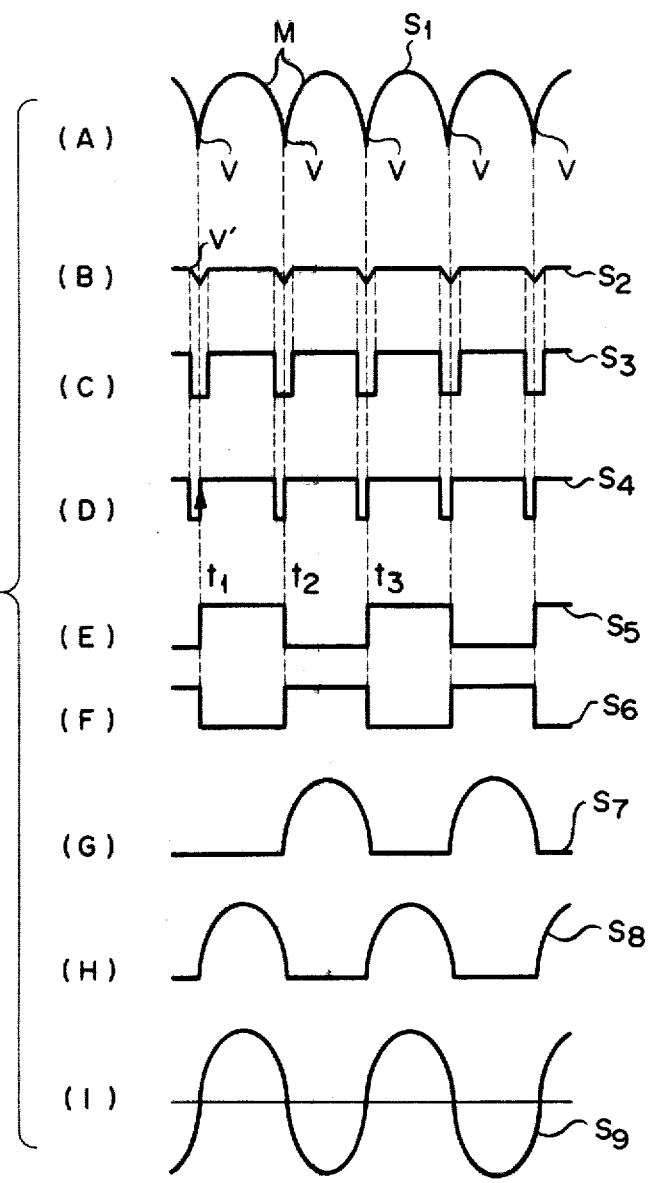
FIG. 6 is a time chart useful for explaining the operation of the AC generating unit shown in FIG. 5.

The pulse signal S3 is supplied to the one-shot circuit 37, which produces negative pulses S4 as shown in (D) in FIG. 6, in response to the falling edge of the input pulses. The output time constant of the one-shot circuit 37 is set such that the rising edge of each negative pulse S4 coincides with the center of each valley V in the full-wave rectified voltage S1. The negative pulses S4 thus obtained are coupled to the flip-flop circuit 38, which functions in synchronism to the rising edge of the input negative pulses S4 to produce rectangular signals S5 and S6 as shown respectively in (E) and (F) in FIG. 6 from its Q and $\overline{Q}$ output terminals. The polarity of the signals S5 and S6 is inverted in synchronism to the valleys V of the full-wave rectified voltage S1.

The Q output S5 of the flip-flop circuit 38 is commonly coupled to the bases of the transistor 39 which is an NPN transistor and the transistor 40 which is a PNP transistor. During a positive period ($t_1$ to $t_2$) of the signal S5, the transistors 39 and 44 and thus the switching transistor 50 are "on". During this period, the signal S6 is negative, so that the transistors 42, 46 and 53 are "on". Consequently, during this period ($t_1$ to $t_2$) the full-wave rectified voltage S1 appearing at the input terminal 30 is permitted through the transistor 50 to appear at the output terminal 52 as shown in (H) in FIG. 6, while it is not led to the output terminal 51 as shown in (G) in FIG. 6.

During the subsequent negative period ($t_2$ to $t_3$) of the signal S5, the transistors 40 and 43 and hence the switching transistor 47 are "on", so that the output S8 does not appear at the output terminal 52 as shown in (H) in FIG. 6. Meanwhile, during this period the signal S6 is positive, so that the transistors 41, 45 and 48 are "on". Consequently, a signal as shown in (G) in FIG. 6 is led through the transistor 48 to appear at the output terminal 51. In this way, the half-wave signals S7 and S8 as shown in (G) and (H) in FIG. 6 are obtained at the respective output terminals 51 and 52. These output voltages S7 and S8 appear between the respective output terminals 51 and 52 on one hand and ground on the other hand, so that the resultant output voltage obtained between the output terminals 51 and 52 has a waveform of a single-phase AC 100-volt voltage as shown in (I) in FIG. 6. The AC 100-volt voltage obtained in this way is coupled to a drive motor of a lens servo-system in the camera head 1.

As has been described in the foregoing, since source power is supplied in the form of a full-wave rectified DC signal from the camera control unit to the camera head and AC voltage is produced within the camera head from the full-wave rectified DC signal by using an AC generating unit of a simple construction, there is no need of providing any large-size unit such as an insulation transformer or a DC-to-AC converter, so that it is possible to obtain a small-size, light-weight camera head. Also, since it is possible to use a thin camera cable connecting the camera head and camera control unit, the operability of the camera head can be improved from this respect as well.

Further, since the outer shield conductor can be grounded when transmitting the full-wave rectified voltage via the two conductors of the double shield in the camera cable, it is possible to safeguard against electric shock accidents. Furthermore, the DC impedance of the individual shield conductors is low enough to ignore voltage drop across the cable at the time of the power transmission.

What is claimed is:

1. A television camera device comprising a camera control unit including a full-wave rectifier for forming a full-wave rectified voltage from a single-phase AC voltage, a camera cable connected at one end to said camera control unit for transmitting said full-wave rectified voltage, and a camera head including a power source unit connected to the other end of said camera cable for receiving said full-wave rectified voltage transmitted through said camera cable, said power source unit including a regulator unit for producing a plurality of smoothed DC voltages from said full-wave rectified voltage and an AC voltage generating unit for producing an AC voltage from said full-wave rectified voltage.

2. A television camera device according to claim 1, wherein said full-wave rectifier has a diode bridge consisting of four diodes.

3. A television camera device according to claim 1, wherein said camera cable serves to transmit a video signal produced from said camera head to said camera control unit and includes a center conductor for transmitting camera head control signals from said camera control unit to said camera head and first and second shield conductors formed one over another on the outer side of said center conductor with insulating layers provided to insulate said shield conductors from each other and also from said center conductor, said full-wave rectified voltage being coupled between said first and second shield conductors for transmission.

4. A television camera device according to claim 1, wherein said AC voltage generating unit includes a zener diode for detecting the valleys of the waveform of said received full-wave rectified voltage, a signal forming circuit having a flip-flop for producing first and second rectangular signals having respective polarities opposite to each other and inverting at the center of the detected valleys, a transistor switching circuit for alternately producing first and second half-wave rectified waveform signals from said full-wave rectified voltage under the control of the output of said signal forming circuit, and a means for forming a single-phase AC voltage from said first and second half-wave rectified waveform signals.

* * * * *